United States Patent [19]

De Haan

[11] Patent Number: 5,179,384

[45] Date of Patent: Jan. 12, 1993

[54] DEVICE FOR IDENTIFYING AND LOCALIZING TRANSPONDERS

[76] Inventor: Frans H. De Haan, Hugo de Grootlaan 18, 7241 HM Lochem, Netherlands

[21] Appl. No.: 726,192

[22] Filed: Jul. 5, 1991

[30] Foreign Application Priority Data

Jul. 13, 1990 [NL] Netherlands .......................... 9001599

[51] Int. Cl.$^5$ .......................... G01S 13/80; G01S 5/06
[52] U.S. Cl. ...................................... 342/37; 342/457; 342/463
[58] Field of Search .................... 342/30, 32, 37, 457, 342/463

[56] References Cited

U.S. PATENT DOCUMENTS 3,665,464  5/1972  Meilander .
3,971,025  7/1976  Levine ................................ 342/410
4,179,695 12/1979  Levine et al. .

FOREIGN PATENT DOCUMENTS 0016417 10/1980  European Pat. Off. .
2073530A 10/1981 United Kingdom .

OTHER PUBLICATIONS

Secondary Radar for Airfield Ground Movement Monitoring by H. N. Griffiths, P. G. Knowles and C. Pell, p. 3, lines 3–14.
Propagation of Mode S Beacon Signals on the Airport Surface, by M. L. Wood (p. 3, lines 17–25 of the specification).

Primary Examiner—Gilberto Barron, Jr.
Attorney, Agent, or Firm—Larson and Taylor

[57] ABSTRACT

The invention provides a Secondary Surveillance Radar (SSR) to be used on airports, in which the airport is divided in a considerable number (preferably 100 to 250) divisional regions, each of said regions having at least one and preferably at least two transmitters (1,2 if FIG. 1; 1,3; 2,4; 3,5; 4,6 in FIG. 4) and at least two receivers (1,2,3 in FIG. 1; 1,2,3; 2,3,4; 3,4,5; 4,5,6 in FIG. 4) to determine the location of interrogated transponder by means of multilateration, in which a transmitter may have the same location as a receiver and the transmitters and receivers are connected to a central processor.

6 Claims, 3 Drawing Sheets

DEVICE FOR IDENTIFYING AND LOCALIZING TRANSPONDERS

The invention relates to a device for identifying and localizing of in aviation usual automatic transponders, so-called SSR-transponders, on an airport, which device has one or more transmitters for transmitting an interrogation signal and one or more receivers for receiving the response signal of a transponder.

Such a device normally is called a Secondary Surveillance Radar or SSR. Already a considerable time experience with suchlike devices exists and their reliability and accuracy are sufficient for most applications. This holds especially for following aircraft in the air. Therewith it has appeared, however, that on the air-port itself or very near to it generally so many aircrafts provided with transponders are present, that often confusion occurs between response signals of different transponders of different airplanes.

It is usual that the response signal of a transponder consists in a pulse series of maximal fourteen pulses, namely one starting and one end pulse and between them thirteen pulse locations on which maximal twelve identification pulses are present or absent. The pulses all have the same frequency, the same shape and the same length and this holds also for the pulses coming from other transponders. An identification code series last 21 µs and 3 µs thereafter an extra pulse may come, which can be used for special position indication, also in total about 24 µs.

This corresponds to a length in space of about 2 nautic miles, if the pulses are propagated electro-magnetically. (This is about 3600 m, but in aviation generally the nautic mile is used as a measure for larger distances). By reason hereof an overlapping of the pulse series may occur, if two transponders are located at a mutual distance of less than 2 nautic miles, so that it becomes difficult to find out which pulse belongs to which series. This phenomenon in practice is called "garbling", because in practice it seems to give rise to things looking like garbled codes. Many circuits have been devised to disentangle this phenomenon, but apart from the fact that they do not give complete security, they are only applicable if two pulse series coincide. If one considers the situation on an air-port on the ground the possibility exists that considerably more than two transponders of airplanes react, in which case identifying and localizing becomes impossible. Therefore in the aviation the general idea rules: "SSR does not work on the ground".

A second reason why SSR on an air-port may give unreliable results, even if clear recognizable pulse series have been received, is, that on air-ports normally buildings are present which form reflection surfaces for the radar bundle which from a central point is directed towards airplanes with transponders. Consequently the bundle is reflected by reason of which a directional change occurs, so that a transponder present in the reflected bundle after its response is localized in the direction of the virtual elongation of the bundle before reflection. Moreover the originally and reflected bundles may interfere, which may lead to extinguishing and garbling.

An interrogation signal according to the concerned international normalisation, especially annex 10 to the convention of Chicago, exists in two pulses P1 and P3 with a fixed mutual time distance, which for identification purposes is 8 µs. To obtain an indication of the fly altitude among others to check whether the airplane is really on the ground, one has the same type of pulses with a mutual distance of 21 µs.

With application of SSR-transponders it is usual, that they are interrogated by a central directional radar bundle and that localisation therewith occurs on base of the momentary direction of the bundle at the time of arrival of the transponder signal.

In the publication "Secundary Radar for Airfield Ground Movement Monitoring" by H. N. Griffiths, P. G. Knowles and C. Pell, Copyright © Controller HMSO, Londen 1976 and Plessey Co., Ltd, a system has been described in which a small number of non-directional transmitters by means of transmitting two interrogation pulses for an transponder at moments with a mutual time difference, which is varied, a divisional region is defined in which a transponder may respond. Therewith it is attained that only a single transponder responds after which the localisation occurs on base of the time of receipt of the response signal by different receivers.

SSR-transponders encompass conventional transponders as well as mode S-transponders. For mode S-transponders M. L. Wood, Propagation of Mode S Beacon Signals on the Airport Surface, The Lincoln Journal, Vol. 2, Number 3, 1989, pages 397–408 mentions also the use of the moment of receipt of the response signal at different locations as a means to locolize the transponder. Herewith the use of mode S-transponders is necessary, it being remarked that up till now only relatively little airplanes have been provided with a suchlike transponder.

Both systems sketched in the above have the disadvantage, that reflections on buildings, vehicles and suchlike may lead to interpretation faults. By reason hereof the liberty to place or displace buildings is limited and new problems may occur with expansion of the airport. A further disadvantage is, that the interrogation signals have to cover at least the region of the airport and consequently have to be relatively strong. This may lead to excessive signal density of the frequency used for interrogating transponders, which aleady now is a problem in certain regions. When overinterrogation of transponders occurs they automatically lower their sensitivity. This may, however, lead to suppression of desired communications.

Accordingly the invention provides with the device indicated in the opening paragraph, that the area of the airport is devided in a considerable number of divisional regions, which each contain at least one transmitter and at least one receiver, which transmitters are devised to transmit interrogation signals to cause transponders present in their divisional region to respond, transmitter control means to cause the transmitter or transmitters of different divisional regions to transmit successively interrogating signals, receipt control means to enable the receivers of that divisional region and a central processing unit to derive the location of the transponder by means of multilateration from time and location of the transmittance of the interrogation signals and time and location of receipt of the response signals.

Herewith the transmitters have such a small power, that they can only activate a transponder at a relatively short distance. By reason hereof the possibility of garbling is strongly reduced and one has further the advantage, that ether pollution by interrogation signals is countered, because the interrogation signals are transmitted successively and may be of small amplitude.

Further it is important that airplanes generally cannot be at any arbitrary location of the airport, but on landings and take off runways and taxe-strips towards the destination locations of airplanes. By reason of this the location of airplanes in the direction tranversely to such a way is known. This may be used to gauge the transponder of the airplane, which increases the accuracy of the invention considerably. Moreover with application of the invention one may shield the transmitters or prevent transmittance in directions where transmitted energy could lead to reflections.

If, according to a further elaboration of the invention a receiver is at the location of the transmitter used the distance between the transmitter and the transponder is determined unambiguously. Therewith also the moment at which the transponder was active, is determined and consequently the distance to further receivers.

Though it is possible to enable the receivers from the central transmitter control, it is simpler to have a transmitter connected with one or more nearby receivers to enable them.

On an airport or suchlike generally it will not be desired, that the communication between the central computer and the transmitters and/or the receivers is wireless. In that instance it is to be preferred that the connections are formed by electrical or light conductors.

In order to limit the number of conducting or light conducting connections between the central control system and the different transmitters and/or receivers it can be provided, that one conductor issuing from the central control system connects more than one transmitter and/or receiver and that these transmitters and/or receivers contain a code recognizing device to establish the connection with the conductors when receiving their connection code.

Generally the responders are devised to respond to a characterizing time interval between two interrogation signals parts. This may be used by transmitting a first signal part with a first transmitter and the second with a second transmitter. Therewith one obtains a region between two hyperbolical curves, in which the transponder responds. Herewith often a better delimiting of a division region can be obtained.

A further sophistication hereof exists in that the time interval between the transmittance of the first signal part by the first transmitter and that of the other signal part by the second transmitter differs from the characterizing time interval. By reason thereof it is possible to shift the hyperbolic curves, which causes a shift of the region in which the transponders respond, by reason of which mostly a better adaptation to the circumstances is possible of the regions, in which the transponders are sensitive.

SSR-transponders respond only if the amplitudes of both interrogation pulses lie within a predetermined proportion region, for instance 2 db. This may lead to a sharper definition of the region in which the transponder responds, which region even can be further divided by varying amplitudes of the interrogation signals. With unequal distance between the transmitters and the transponder normally an amplitude adaptation is necessary.

The invention needs not to be restricted to a single type of transponder. So it is possible to provide on an airport not only the airplanes, but also the service cars with a transponder. With a time distance between the interrogation signal parts of 8 μs the interrogation signal of for instance 12 μs can be used.

When using more than three receivers for one transmitter one obtains a certain redundancy, which can be used as a correction means, if the transponder is not located on a line through two receivers.

One applying the invention it is possible to mount the transmitters and receivers near to the ground, for instance at the border of take off and/or landing runways and/or the border of taxe-strips. This has the advantage that the airplanes are irradiated from below, which minimizes considerably the chance of shadow forming by the airplane itself, for instance the body or the engines. Shielding by the landing-gear can be prevented by providing that a main lobe of the transmitted interrogation signal is oriented in the direction of the runway. When applying the invention it is easy to see to it, that the region in which the transponder is activated is at a distance of more than 100 m of the transmitter, which excludes practically a shadow effect of the landing-gear.

Still a further advantage can be obtained by providing that the transmitters have a transmitting aerial with vertical polarisation at a level above the ground of an odd number quarters of the wave length of the transmitted signal, preferably three quarter of that wave length. Herewith one has the advantage that interference between the ground wave and the direct wave gives a lobe in the transmitter pattern, which causes a good irradiation of transponders located relatively low above the runway, but that in directions steeply upwards practically no energy is radiated, which reduces in a considerable degree hindrance which the interrogation signals could create.

The invention in the following is further elucidated on hand of the drawing in which.

Figure 3:
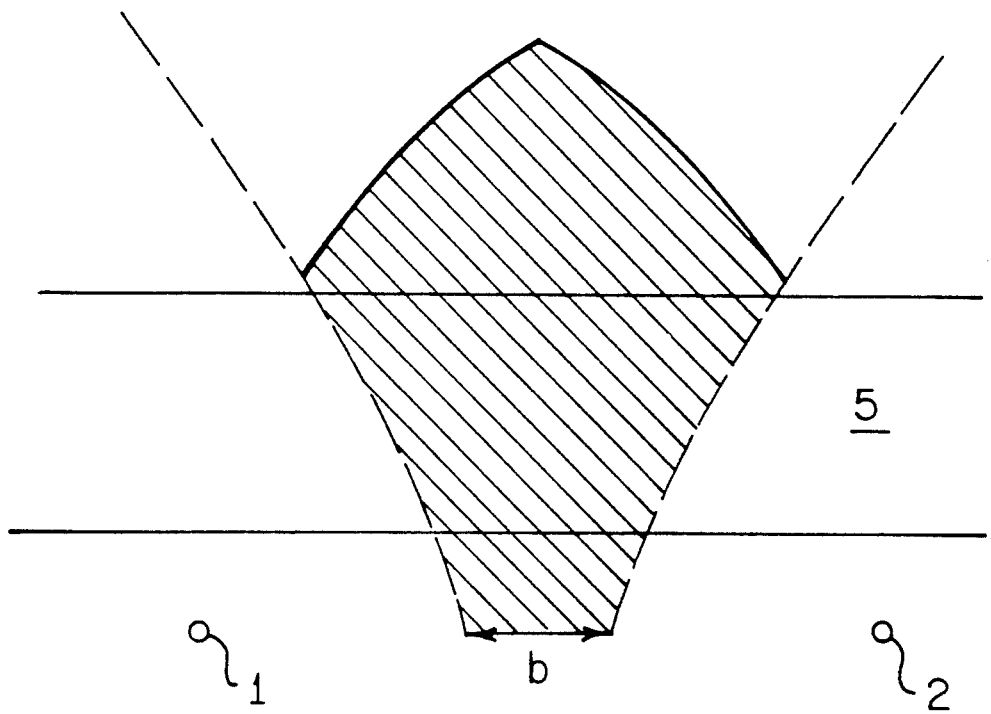
FIG. 3 shows a scheme with two transmitters of which the one transmits the first and the second transmits the second pulse of an interrogation signal, the region covered by these transmitters being indicated.
Figure 4:
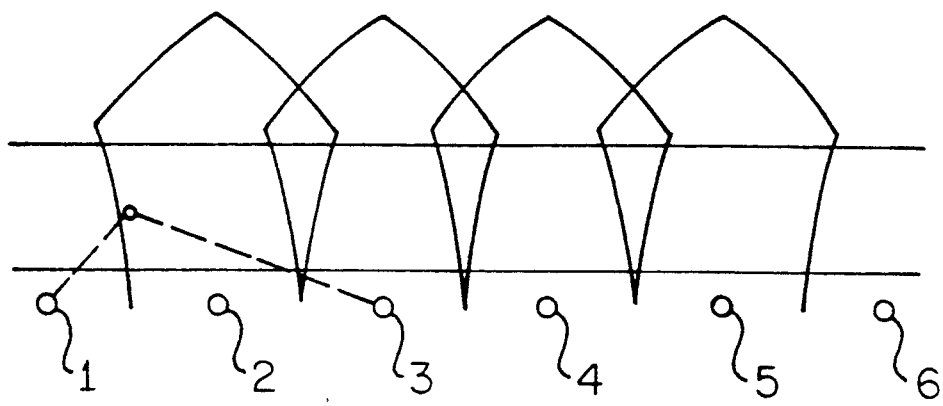
Figure 5:
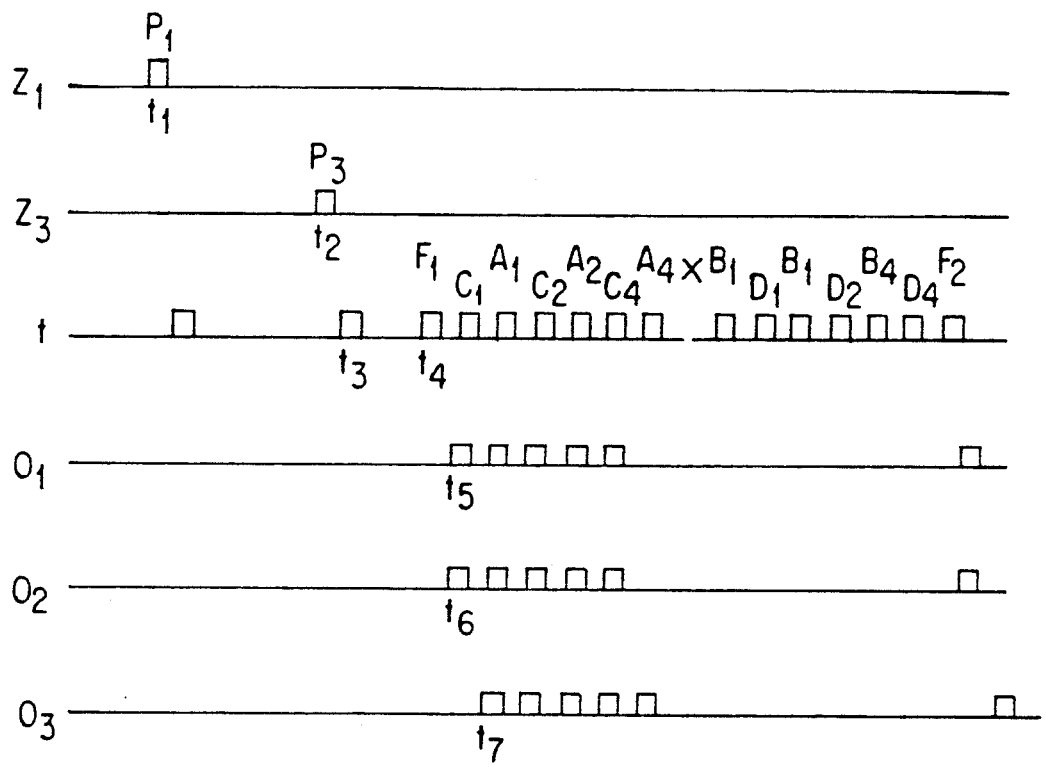

FIG. 4 the same shows as FIG. 3, but with intermittent transmitters, so that a closed region is covered;

FIG. 5 shows the time graphs relating to FIG. 4; and

Figure 6:
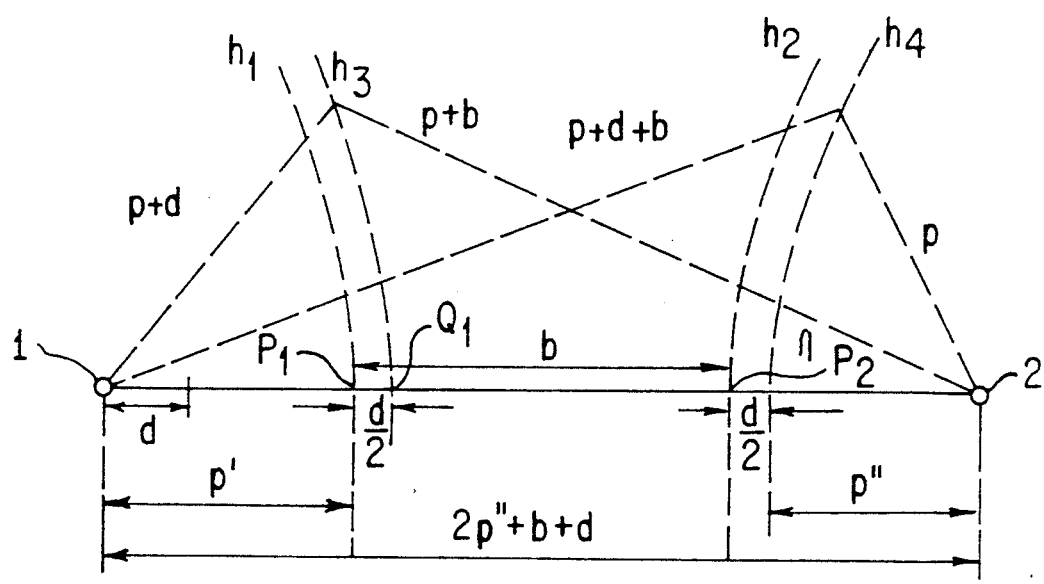

FIG. 6 shows a plan view of the use of two transmitters, each for one pulse of the interrogation signal, wherewith the moment of transmittance is shifted to vary the working region.

Figure 1:
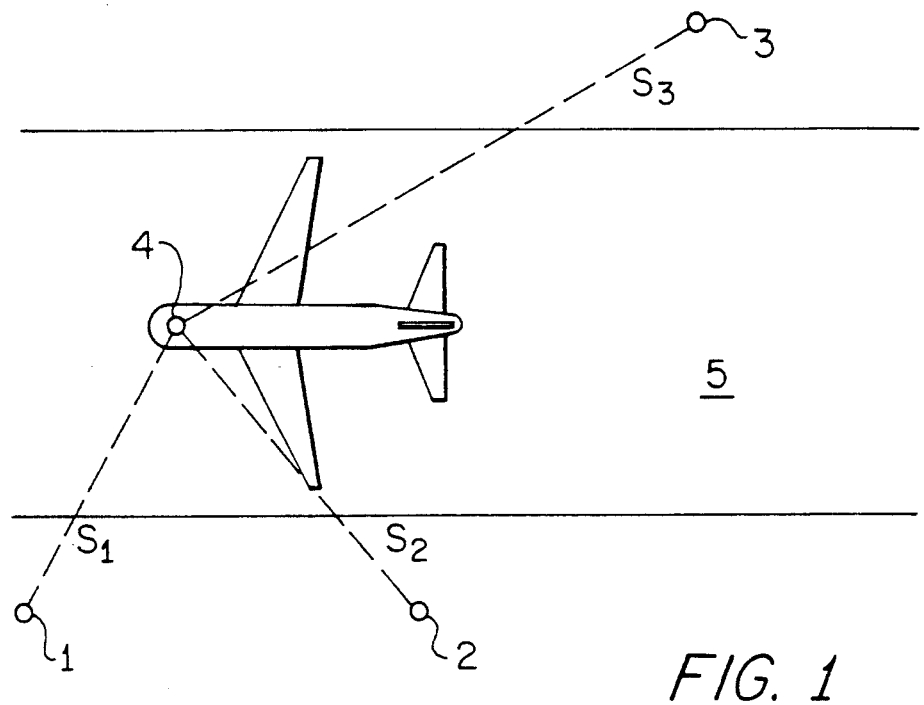
FIG. 1 is a plan view of a case, in which one transmitter/receiver radar installation and two radar installations used as receiver have been appied.

In FIG. 1 references 1,2 and 3 indicate three radar installations and 4 the transponder in a schematically indicated airplane on a runway or taxi-strip 5.

Figure 2:
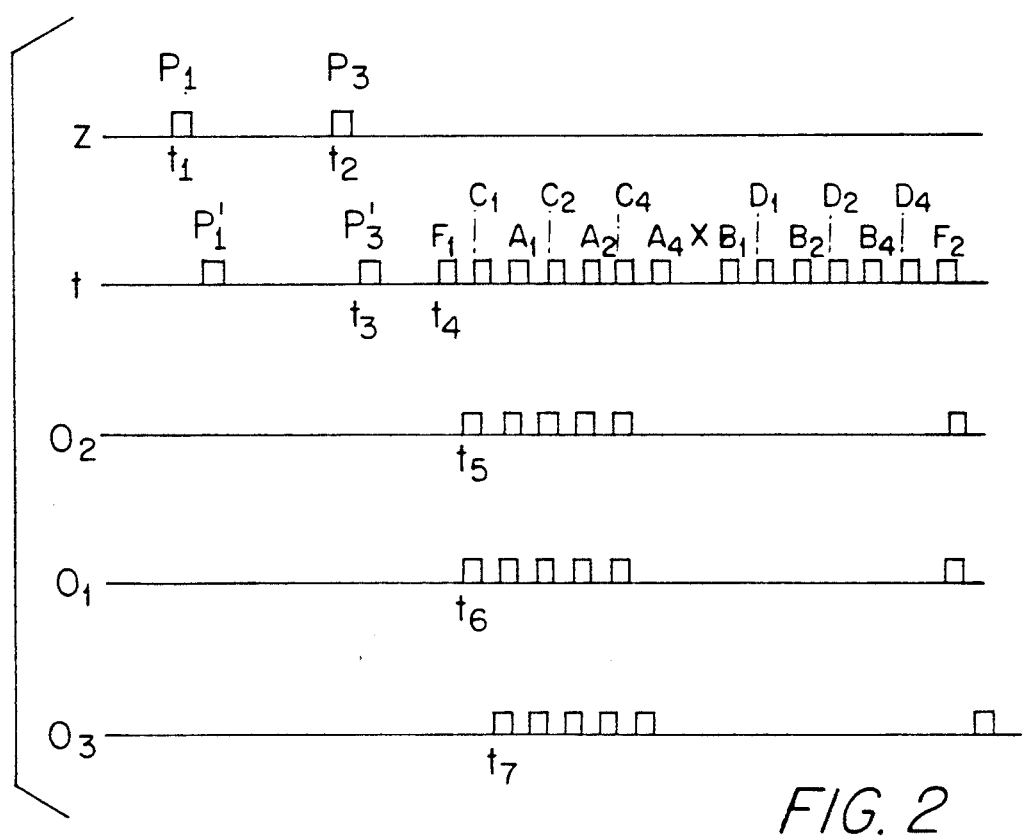
FIG. 2 shows a time graph of the pulses occurring therewith.

In FIG. 2 the pulses occurring therewith have been indicated. The pulses $P_1$ and $P_3$ are transmitted by the installation 2 and have a predetermined interval van 8 μ sec., as is usual for transponders. In the line t of the transponder has been indicated, when these pulses, there indicated with $P_1'$ and $P_3'$, reach the transponder, which then after a fixed period of 3 μ sec. transmits its response, which consists in a first pulse $F_1$, then the pulses $C_1, A_1, C_2, A_2, C_4, A_4$, which may be present or not, a pulse location X where never a pulse is present and the pulses $B_1, D_1, B_2, D_2, B_4, D_4$, which may be present or not.

The installation 2 which now is used as receiver, indicated with the line $O_2$ receives this transponder pulse series at the time $t_5$, whereas the receivers 1 and 3, indicated with the line $O_1$ and $O_3$ receive it at the times $t_6$ and $t_7$ resp.

One has now the following relations:

$$t_2 - t_1 = 8 \; \mu \; \text{sec}.$$

$$t_3 - t_2 = s_2/c, \text{ when c is the velocity of light,}$$

$$t_4 - t_3 = \Delta t \text{ (fixed waiting time of the transponder)}$$

$$t_5 - t_4 = s_2/c.$$

Addition of the last three equations gives:

$$t_5 - t_2 - \Delta t = 2s_2/c$$

$$t_4 = t_5 - s_2/c$$

$$s_1 = c \, (t_6 - t_4)$$

$$s_3 = c \, (t_7 - t_4)$$

There is one equation more than there are unknown quantities, so that redundancy occurs, which can be used as check or may possibly replace a lacking signal.

FIG. 3 shows the case that from the radar appliance 1 and 2 a first interrogation pulse $P_1$ is transmitted by appliance 1 and a second interrogation pulse $P_3$ by appliance 2, wherewith the period between the moments of transmittance of the pulses and the interval of these pulses in the transponder are equal to each other. With a tolerance in the time of the transponder, which equals b/c, in which c is the light velocity, one has two delimiting hyperbolic curves, where between the transponder may respond. Further the region is delimited by circles about the points 1 and 2, which in practice are formed by the transmittance power of the transmitters, which is so weak that beyond these circles a transponder should not respond anymore.

Of course the patterns of the radar appliances are located such, that almost no chance exists that other transponders within that reach can respond, wherewith the radar appliances preferably are located along a runway or taxi-strip. Therewith the distance between two transmitters may for instance be 450 m and that of the region, in which a transponder responds 150 m on base of time correspondence. On base of amplitude correspondence this becomes about 50 m. One has then preferably between the two used transmitters two stations, which may serve as receivers. In order to be able to determine well the location of the aircraft with respect to the centre-line of the runway or strip one preferably has a third station which is not located on the line connecting the two other stations, and for instance lies along a track parallel to it. That third station can also be used with measurents along the latter track. Of course is the indicated measure of 450 m and 150 m are purely arbitrary. Also the presence of two stations between the stations which are used as transmitter is arbitrary.

In this way FIG. 4 shows a case with a plurality of radar appliances 1,2,3,4,5 and 6, wherewith first 1 and 3 are used as transmitter, after this 2 and 4 and so on, wherewith a closed scanning region is obtained, because the separate covered regions overlap each other.

FIG. 5 shows the time graphs of the pulses, in which $Z_1$ and $Z_3$ are those of the radar appliances 1 and 3 used as transmitter, that of again the pulses arriving at the transponder and $O_1$, $O_2$ and $O_3$ respectively show the pulses received by the radar appliances 1,2 and 3 respectively used as receivers, whereas in the following $s_1, s_2$ and $s_3$ indicate their distance to the transponder. One has now the equations:

$$t_3 - t_2 = s_3/c$$

$$t_4 - t_3 = t$$

$$t_5 - t_4 = s_1/c$$

$$t_6 - t_4 = s_2/c$$

$$t_7 - t_4 = s_3/c.$$

One has now five unknown quantities $t_3, t_4, s_1, s_2$ and $s_3$ and five equations to determine them.

Finally in FIG. 6 a possibility has been indicated to shift the regions covered by two transmitters which each transmit one interrogation pulse by causing one of the transmitters to transmit its pulse earlier or later than corresponds to the time interval between the first and second interrogation pulse to which the transponder responds. In this figure with d the distance has been indicated, which an electro-magnetical wave travels in the time the radar appliance 1 transmits to early. With a tolerance time which after multiplying with the light velocity gives the length b, without time shifting one obtains again the hyperbolic curves $h_1$ and $h_2$. By earlier transmitting of transmitter 1 one obtains the hyperbolic curves $h_3$ and $h_4$.

The distance p' of the point of intersection $P_1$ with the axis 1,2 of the curve $h_1$ to the transmitter 1 equals the distance of transmitter 2 to the point of intersection $P_2$ of the curve $h_2$ with the axis 1,2. The difference between the length of the focus radii is determined by the tolerance of the transponders and is in this example b.

The distance between the transmitters 1 and 2 consequently equals 2 p'+b. If one lets now transmitter 1 transmit a short time before transmitter 2, for instance suchlike, that electro-magnetic waves travel in that time period the distance d, then a hyperbole with curves $h_3$ and $h_4$ is formed.

At the moment the wave from transmitter 2 has travelled a distance p" the distance of the left curve the focus from 1 equals the length p"+d and that of transmitter 2 is p"+b. On the axis 1,2 lies the intersection point $Q_1$ of the curve $h_3$ with the axis 1,2 at a distance p"+d from transmitter 1 and a distance p"+b from transmitter 2.

The distance between the transmitters 1 and 2 consequently is 2 p"+b +d.

Consequently the equation 2 p'+b=2 p"+b +d holds, from which follows:

$$d = 2(p' - p'') \text{ or } p' - p'' = d/2.$$

Consequently the distance between the curves $h_1$ and $h_3$ equals d−d/2=d/2.

Consequently it is possible to shift the region, in which a transponder responds over a distance x by causing the interrogation pulse of the concerned transmitter to be transmitted 2x/c earlier or later with respect to the transmittance of the other transmitter. Herewith the proportion of the transmitted powers should be adapted.

For a large airport such as Amsterdam airport, about twohundred radar posts suffice. These can be carried out so low, that they can be located practically immediately along the runways for the airplanes without dangering the airplanes. In such a case, based on for instance two hundred fifty radar appliances and the case that bearings should be taken of airplanes as well as vehicles, with each second a total scanning one has a time period of 2 ms for each bearing taken. This now proves amply sufficient to carry out eight measurements with sufficient time intervals for each bearing.

Therefore it is for a relatively large airport possible and desired that the "considerable number of divisional regions" is in the order of 100 to 250. For smaller airports this number may be smaller, but normally one has when applying the invention at least 10 or 20 divisional regions and preferably considerably more.

Because a single measurement requires only a few times ten, for instance 50 μs and the usual transponders are ready again for a following interrogation after a lapse of 120 μs after a response, one has ample time to repeat a measurement with the same transmitter(s) and receiver(s) a number of times, for instance eight times, with sufficient time between the measurements to prevent confusion.

It is now possible to store the response signal of each measurement in a register by taking samples of the transponder signal, for instance each 50 ns. Reading of these registers requires little time. In this way it is possible by comparison of the response signals to eliminate responses to interrogations by SSR-installations not belonging to the own system and signals of other installations which occur at the same frequency. Moreover in this way it can be prevented, that hindrance is suffered when icidentically a transponder does not respond to an interrogation.

If one has tow types of carriers, for instance airplanes and cars, it is possible to interrogate the first one in a first mode, for instance mode A with an interval between the interrogation pulses of 8 μs, whereas the other type of carrier is interrogated in an other mode, for instance mode B with an interval between the interrogation pulses of 12 μs. Of course it is also possible to use different frequences for interrogation and response of the different transponders.

When placing the stations on the border or immediately adjacent the border of a runway or taxi-strip one has the advantage of a strong ground reflection, causing extinguishing in vertical direction, but within the reaches used with the invention no disturbing intefference between immediate and reflected beams will occur. Therewith the aerials may be very low above the ground, for instance ⅜λ, if λ is the wave length. This height is almost the same as that for lamps, which are used very near to the border of the runway within that runway and to prevent damage by strong air currents issuing from jet engines it is possible to enclose the aerials in robust small houses of plastic material.

Because with the invention the transponders are relatively near to their receivers, the latter may be adjusted to a small sensitiveness so that the chance becomes small that disturbances may occur by other signals, for instance transmitted by transponders not interrogated by the device according to the invention.

When using two transmitters it is possible, that one of them transmits the first part, for instance the first half of an interrogation pulse for a transponder and the second transmitter a second part. Also this is covered by the invention.

I claim:

1. Device for identifying and localizing secondary surveillance radar transponders at an airport, said device comprising a plurality of groups each comprising at least first and second transmitters for transmitting an interrogating signal, said first transmitter transmitting a first signal part of said interrogating signal and said second transmitter transmitting the second signal part of the same said interrogating signal, the first and second transmitters of a group being located near the border of a runway or taxiway, said airport being divided in a plurality of divisional regions each of which contains one said group of said first and second transmitters, the number of divisional regions being at least ten, the first and second transmitters of a said group being located at different locations along the length of the corresponding runway or taxi-way, each said group further including at least two receivers for receiving the transponder signal and multilateration means for deriving from the time and location of signals received from a transponder by said receivers, the location of that transponder, said receivers including inhibiting means for inhibiting reception of signals by said receivers, and said device further comprising control means for disabling the inhibiting means of the receivers of at least one group and for enabling the inhibiting means of receivers of other groups.

2. Device according to claim 1, in which at least some groups comprise at least three receivers for receiving the transponder signal.

3. Device according to claim 1, wherein the time interval between transmission of the first signal part by the first transmitter of a group and the transmission of the second signal part by the second transmitter of a group is adjustable, and wherein the amplitude of the signal parts transmitted by the transmitters is adapted to compensate for differences between the distances from the respective transmitters to an area to be interrogated.

4. Device according to claim 1, in which one of the transmitters of a group enables the receivers of the group and transmits one of the signal parts and in which time measuring means are provided for determining the time interval between the time of reception of a transponder signal and the time of transmission of the signal parts.

5. Device according to claim 4, characterized in that the time measuring means including a register for storing in memory sample values of the transponder signal at predetermined time intervals.

6. Device according to claim 1, in which the number of divisional regions is at least twenty.

* * * * *